United States Patent Office 3,505,195
Patented Apr. 7, 1970

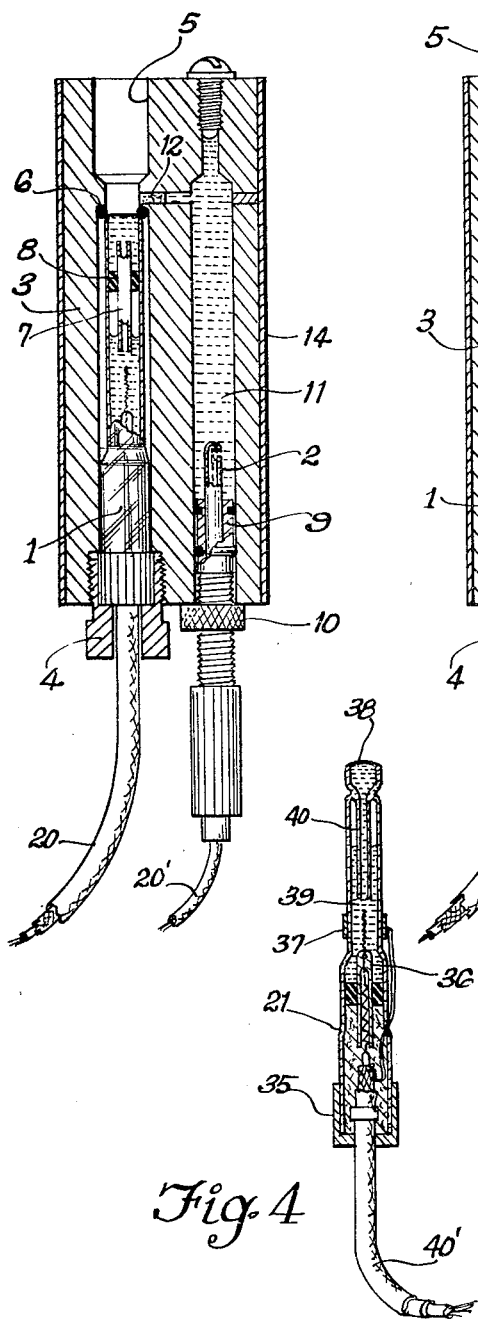
Fig. 1
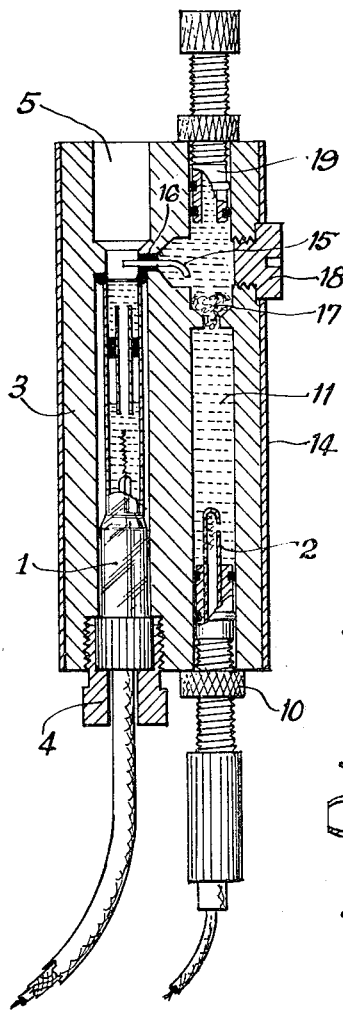
Fig. 2
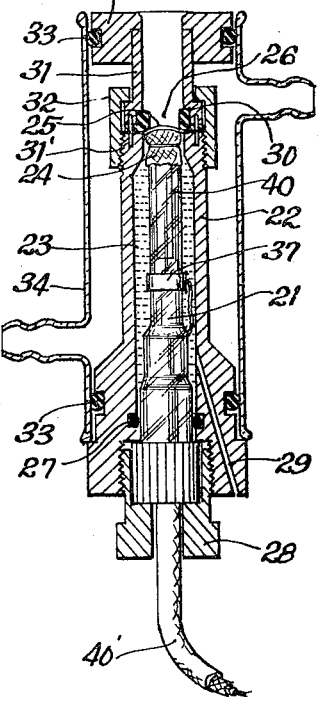
Fig. 3
Fig. 4
INVENTORS
Borge Aagaard Nielsen
Ole Jorgen Jensen
by McDougall, Hersh & Scott
Attys INVENTORS
Borge Aagaard Nielsen
Ole Jorgen Jensen
by McDougall, Hersh & Scott
Att'ys

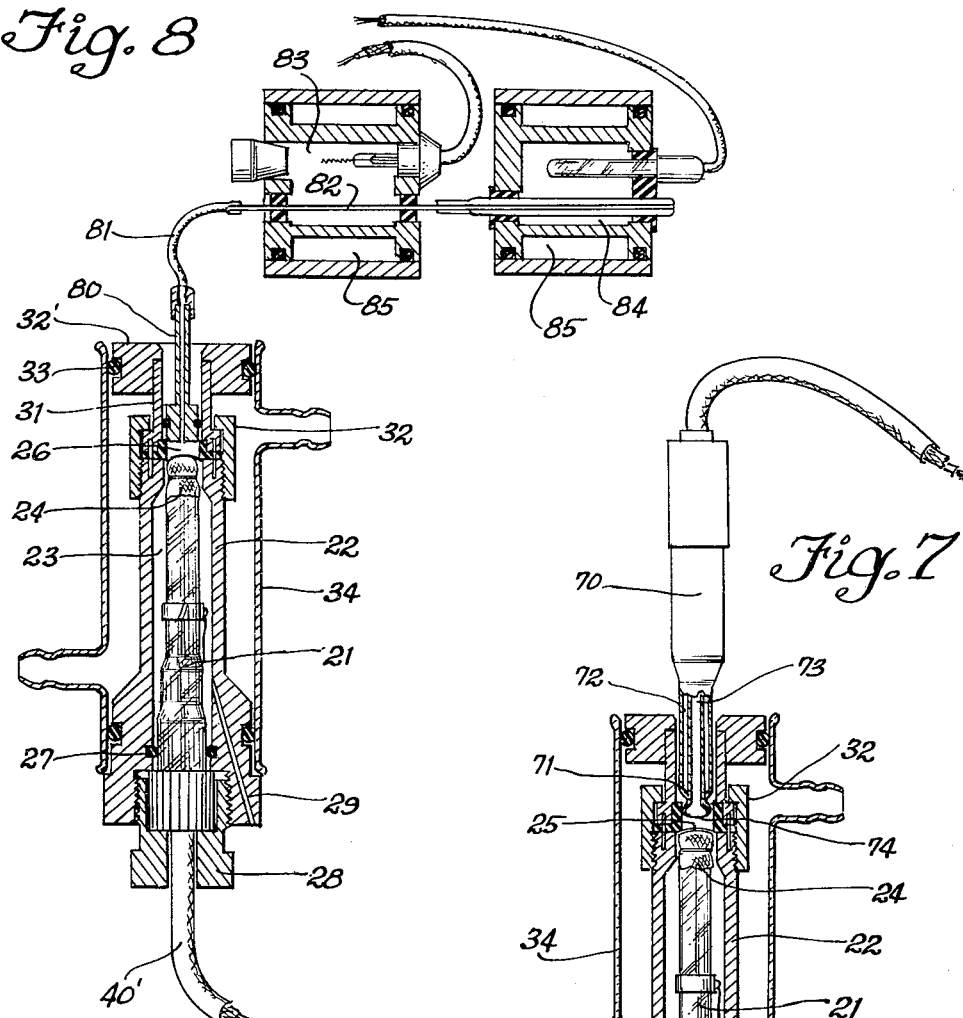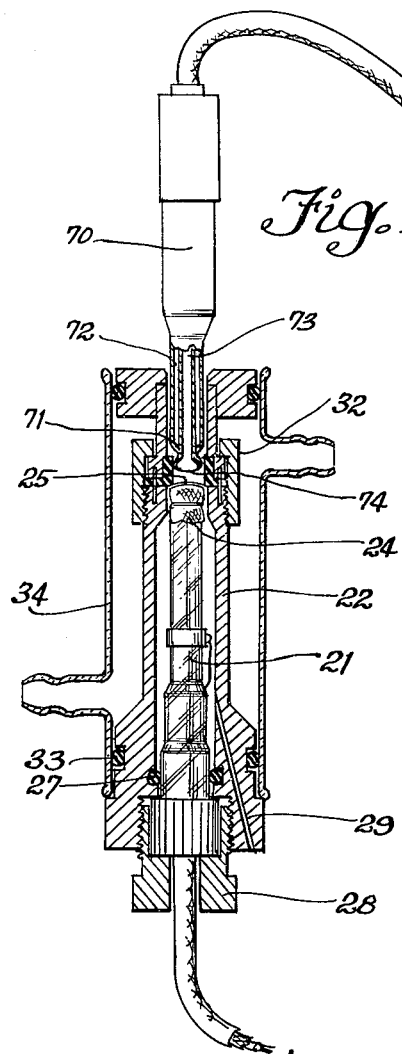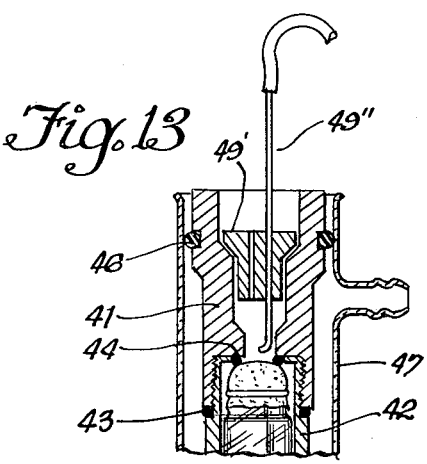

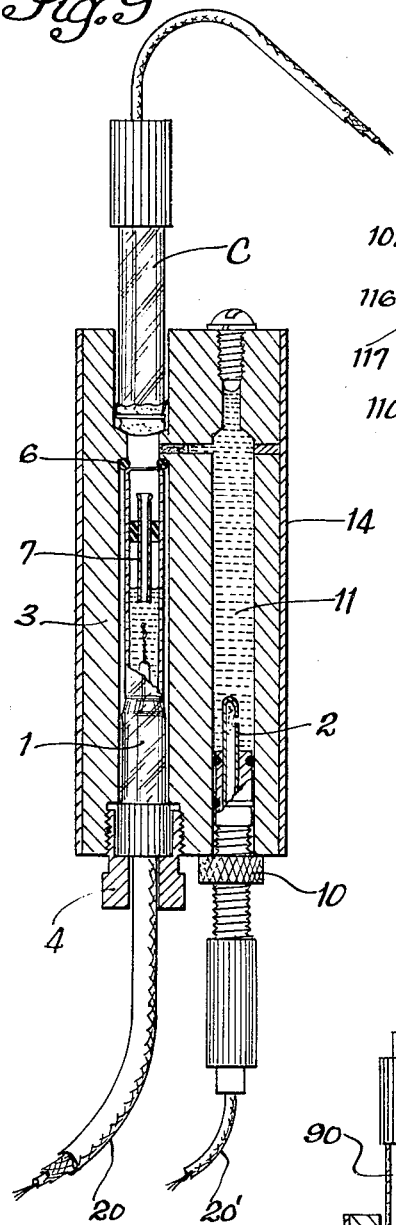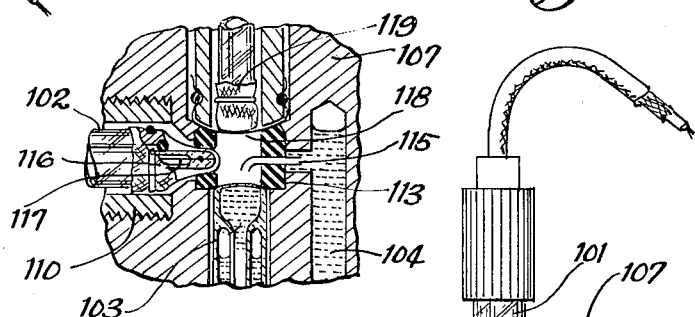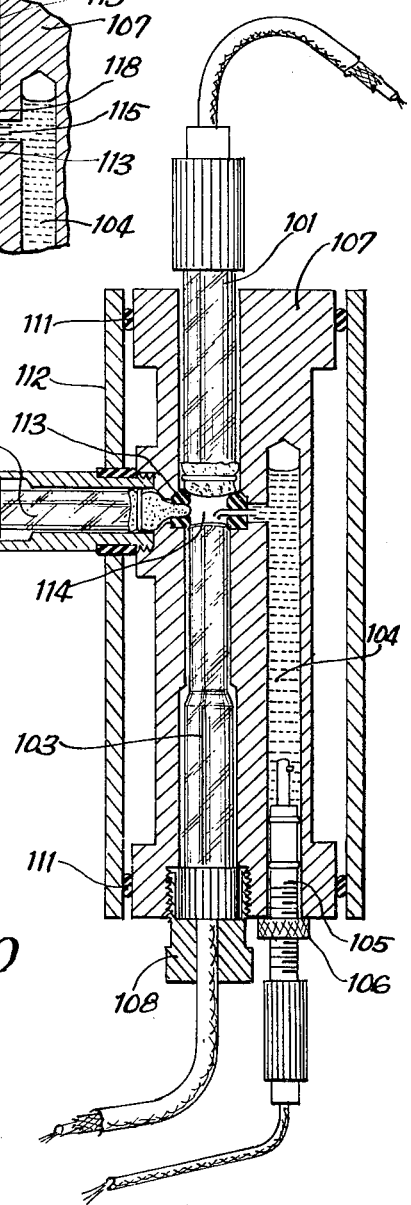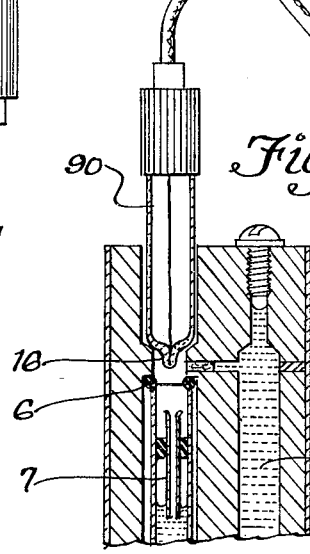

3,505,195
ELECTRODE SYSTEM FOR ELECTRO-CHEMICAL MEASUREMENTS IN SOLUTIONS
Borge Aagaard Nielsen, Hellerup, and Ole Jorgen Jensen, Gentofte, Denmark, assignors to Radiometer A/S, Copenhagen, Denmark
Filed Dec. 29, 1965, Ser. No. 517,369
Int. Cl. G01n 27/54, 27/46
U.S. Cl. 204—195      16 Claims

ABSTRACT OF THE DISCLOSURE

An electrode system for electro-chemical measurements of a liquid sample of the type employing at least two electrodes comprising an indicator electrode and a reference electrode. The indicator electrode is vertically disposed in the system and the top surface of the indicator electrode comprises a membrane which defines the bottom wall of the measuring chamber in which the sample is freely accessible from above.

---

This invention covers an electrode system or configuration consisting of a reference electrode, and one or more indicator electrodes which are adjacent to, and which may constitute the bottom of a measuring cell. The reference electrode and the indicator electrode are electrically connected through an electrolyte, which in the case where the indicator electrode constitutes the bottom of the measuring chamber, may be the liquid in the measuring chamber itself.

Conventional electrode systems for similar measurements have the electrodes mounted in the upper part of the measuring chamber or in the sides of the measuring chamber. In the first case, the measuring chamber cannot be filled directly from the top; further, air bubbles will often be produced during the filling and appear close to the indicator electrode, unless the chamber is made so big that the indicator electrode can be dipped into the liquid sample. To place the electrode in the sides of the chamber will to a certain extent safeguard against air bubbles close to the indicator electrode, but this arrangement of the electrode will put a natural lower limit to the dimensions of the measuring chamber, thus requiring larger sample volumes. In general, in such an electrode, it would be necessary to fill the chamber from the bottom to avoid air bubbles, and this is generally done by means of a system of inlet and exit tubes, all of which add to the required minimum sample volume, and which can be avoided completely when the measuring electrode constitutes the bottom of the measuring chamber.

It is a general object of this invention to provide an electrode system for electro-chemical measurements in solutions which overcomes the disadvantages recognized in conventional electrode systems.

It is a more particular object of this invention to provide an electrode system characterized by advantages generally described as follows:

(1) Air bubbles which are commonly noted in such liquid samples cannot disturb the measurement when the indicator electrode forms the bottom of the measuring cavity.

(2) When the indicator electrode forms the bottom of the measuring chamber, there is an attendant ease in filling and emptying the measuring chamber.

(3) Such a design also permits filling the sample chamber from the top, with the result that the measuring chamber can be small in size; and no additional sample volumes are required to fill the tubes constituting inlets to and exits from the measuring chamber.

(4) Such a construction or design facilitates the introduction of gases for either purpose of electrode calibration and/or altering the gas partial pressure of such as a blood sample for purposes of acid-base measurements.

These and other objects of this invention will appear hereinafter, and for purposes of illustration but not of limitation, specific embodiments of this invention are shown in the accompanying drawings in which:

FIGURE 1 is a vertical sectional view of an electrode system for pH measurement characterized by the features of this invention;

FIGURE 2 is a vertical sectional view of a modified electrode system for pH measurement characterized by the features of this invention;

FIGURE 3 is a vertical sectional view illustrating the system during measurement of $Pco_2$;

FIGURE 4 is a vertical sectional view of a glass electrode construction employed in the system of this invention;

Figure 5:
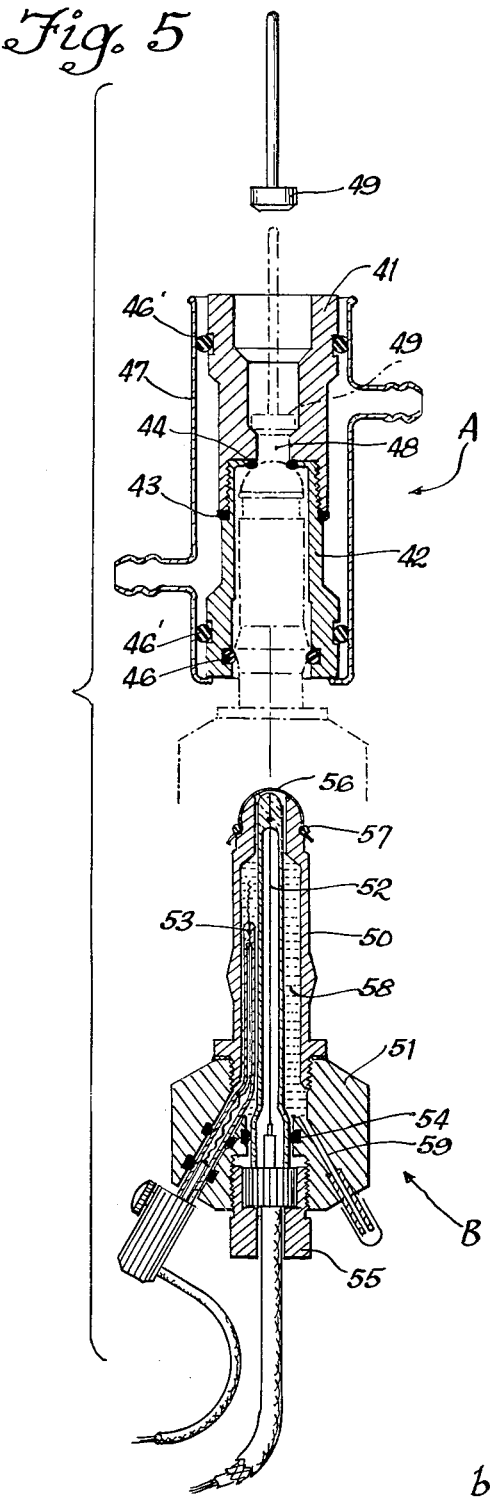
FIGURE 5 is a vertical cross sectional view of an electrode set up for the determination of $Po_2$.

FIGURES 6 through 9 comprise vertical sectional views of arrangements wherein two electrodes are employed in the system;

FIGURE 10 illustrates a fragmentary vertical sectional view comprising an alternative arrangement relative to the construction shown in FIGURE 9;

FIGURE 11 illustrates a vertical sectional view comprising an electrode system adapted for the simultaneous measurement of $Po_2$, $PCo_2$ and pH;

FIGURE 12 is an enlarged detail view in cross section of the measuring chamber of FIGURE 11; and, FIGURE 13 is a fragmentary view in cross section of a device for equilibration with gas shown in combination with the top portion of the construction shown in FIGURE 5.

The electrode system covered by this invention is primarily intended to make electro-chemical measurements such as amperometric and potentiometric measurements on the required small liquid volume, which for practical purposes in the biological and biochemical fields means sample volumes between 10 microliters and 200 microliters. Examples of potentiometric measurements, which can be of interest to make in such small samples, are the determination of pH, and of $Pco_2$, the latter being the partial pressure of carbon dioxide. A similar example of an amperometric measurement is determination of $Po_2$, the partial pressure of oxygen.

The determination of the parameters of PH, $Pco_2$ and $Po_2$, for example, in so-called micro-volumes of sample liquid, is most important in medicine, in biochemistry and in biology. The volume of sample available is often dictated by the method available of collecting that sample. In the case of blood, for example, it is now generally recognized that capillary blood, taken from the finger tip or earlobe, is completely adequate for such measurement; and 200 microliters or less, and more often 50–75µ l., may be expected per collected sample on a routine basis.

In the collection of such samples, in present day hospital techniques, small pre-heparinized glass tubes are commonly used. One of the major advantages of such an electrode system as described in this invention is that a blood sample so collected can run freely and directly into the measuring chamber, covering the bottom and hence the sensitive part of the indicator electrode. Further, even in such microsamples, this invention facilitates the introduction of gases of known consistency for purposes of either calibration of the electrodes, or for alteration of the gas partial pressure of the sample, as in the case of blood for the measurement of acid-base values other than pH, and $Pco_2$.

Where a glass indicator electrode borders or constitutes the bottom of the measuring chamber, as in the case of pH or $Pco_2$ measurements, a special electrode construction is required. The glass electrode must operate in a vertical position with the sensitive surface upward and with no air bubble between the inner surface of that membrane and the inner buffer liquid. The design of such an electrode forms part of this invention.

An electrode set-up for the measurement of pH according to the design described above can take the form shown in FIGURE 1. The indicator electrode 1 and the reference electrode 2 are placed in a body of insulating material 3, which has been placed in a metal tube 14 to provide electrical shielding. The indicator electrode 1 is firmly mounted in the insulation body 3 by means of a cap nut 4 and the tightening between the electrodes and the measuring chamber 5 is achieved by means of an O-ring 6. The indicator electrode is in the case described a glass electrode with a plane or nearly plane membrane (MacInnes Electrode) of such a design that an air trap has been mounted inside the electrode in the shape of a glass tube 7 mounted in a rubber stopper 8. The reference electrode is a calomel electrode consisting of a typical calomel half cell mounted as a rod in a plastic plunger 9, the position of which is determined by a cup nut 10. By means of a salt bridge 11, which can contain a saturated solution of potassium chloride, the reference electrode is connected to the measuring chamber 5 through a porous material 12, which has been placed at the transition between the salt bridge and the measuring chamber. For measurement on liquid samples, in which the pH could be changed by the influence of the air, the measuring chamber can be covered by means of a lid 13. The electrodes are adapted to be connected to a pH meter by means of leads 20 and 20'.

An arrangement for measuring $Pco_2$ according to the described invention is seen in FIGURE 3. The electrode set up consists of a combined glass and reference electrode 21 (hereinafter called the combination glass electrode), which is mounted in an electrode jacket 22 of plastic. The cavity in the electrode jacket 22, in which the combination glass electrode 21 is placed, is filled with an electrolyte 23, in which the pH is changed according to the carbon dioxide content of the solution, and which at the same time establishes a stable potential of the reference electrode. In a typical case, the electrolyte solution has been 0.002 M NaCl and 0.005 M $NaHCO_3$. The tip of the combination glass electrode is surrounded by a thin layer of porous material (Joseph paper) 24. A thin membrane of an electrically insulating plastic foil (Teflon) 25 is placed over this porous material, and an exchange of carbon dioxide between the sample in the measuring chamber 26 and the electrolyte layer over the tip of the glass electrode takes place through the plastic foil. In the lower part of the electrode jacket an O-ring 27 tightens around the combination glass electrode 21, which is pressed against the membrane 25 by means of a cap nut 28. A narrow channel 29 assures pressure equalization between the interior of the electrode jacket 22 and the surrounding atmosphere. The sides of the measuring chamber are made up by a butyl rubber gasket 30, which at the same time tightens against the plastic membrane 25. The gasket 30 is mounted in a tubular body comprising the upper sleeve 31, which is pressed against the electrode jacket 22 by means of the cap nut 32. Two guide pins 31' assure that the upper sleeve itself and the electrode jacket 22 do not turn with respect to one another during the mounting. The electrode jacket and collar of the upper sleeve 32' are provided with a groove for O-rings 33 so that the electrode set-up can be mounted in a glass jacket 34 to circulate water from a thermostat, by means of which the complete set-up can be thermostatted.

FIGURE 4 shows the combination glass electrode 21 alone. It consists of a socket 35, the internal reference electrode, which is a chlorinated silver electrode 36, the external reference electrode 37, which is a ring of a silver plated sheet of platinum, and a slightly curved or plane or substantially plane glass membrane of pH sensitive glass 38.

The interior of the glass combination electrode is filled with a buffer solution containing chloride 39. Between the inner reference electrode 36 and the glass membrane 38, there is mounted an air trap comprising a glass tube 40. One end of the tube is fused to the interior glass wall of the electrode and the other, free end, directed down towards the socket end of the combination glass electrode. The latter air trap permits the use of the combination glass electrode in a vertical position.

The electrode is connected by means of the lead 40' to a pH meter with high input resistance with a dial which can be calibrated in mm. Hg units for direct reading of $Pco_2$.

FIGURE 5 shows an electrode arrangement characterized by the features of the invention for the determination of $Po_2$. The electrode system so described has two main parts:

(a) A thermostatted measuring chamber, and
(b) The $Po_2$ electrode.

The thermostatted measuring chamber (A) consists of two machined parts comprising a sample tube 41 and an electrode tube 42, which have been screwed together. A gasket 43 of a plastic material tightens between the sample tube 41 and the electrode tube 42. In the electrode tube 42, where contact is made with the sample tube 41, there is provided an annular shaped gasket of butyl rubber 44 for tightening against the $Po_2$ electrode. An O-ring 46 in the lower part keeps the $Po_2$ electrode in place. The electrode tube and the sample tube are provided with O-rings 46' in such a manner that these parts can be placed in a glass jacket 47 for thermostatting purposes. The measuring chamber 48, the sides of which are made up by the sample tube 41 and the bottom of which is made up by the $Po_2$ electrode (B), can, if desired, be closed by means of a lid 49.

The $Po_2$ electrode "B" is on the whole a design similar to commercially available electrodes, for example, a Clark Electrode (U.S. Patent No. 2,913,386). It consists of an electrode jacket 50 with an electrode head 51, in which has been placed a platinum indicator electrode 52 with planer or slightly spherical point and a silver electrode 53 as the reference electrode. The platinum electrode 52 and the silver electrode 53 are fixed by means of O-ring gaskets 54. By means of the cap nut 55, the sensitive part, i.e., the point of the platinum electrode, is pressed lightly against a membrane 56 of plastic film, which electrically insulates the indicator electrode from the liquid sample in the measuring chamber, but permits oxygen from the sample to diffuse to the point of the platinum indicator electrode, where a quantitative reduction of the oxygen takes place. The membrane 56 is fixed over the point of the electrode jacket 50 by means of an O-ring 57. In the space between the electrodes 58 an aqueous electrolyte solution is placed, in which the basic contents are a pH buffer and an alkali chloride. A narrow channel 59 in the electrode head 51 assures pressure equalization to the surroundings without any danger that the electrolyte could run out of the electrode. The $Po_2$ electrode is connected to an amperometric measuring equipment, in which the voltage between the platinum electrode 52, which is a cathode, and the reference electrode 53, which is an anode, is maintained constant preferably at about 0.6 v.

The current through the electrode system is proportional to $Po_2$ of the sample in the measuring chamber and is, in a suitable electrode set-up, of the order of magnitude $10^{-11}$ A./mm. Hg.

By substituting the platinum electrode 52 with a glass electrode and the electrolyte solution with a bicarbonate solution containing chloride ions, the electrode set-up of FIGURE 5 for measurement of $Po_2$ is easily transformed to an electrode set-up for measurement of $Pco_2$, as in FIGURE 3. Conversely, an electrode system for measurement of $Pco_2$ (FIGURE 3) is easily transformed to a measuring set-up for $Po_2$ by replacing the combination glass electrode used with a combination platinum electrode, i.e., a platinum and reference electrode built together, and substitution of the electrolyte solution used by another of the same type as used in the electrode set-up mentioned above (FIGURE 5). The porous material 24 in the $Pco_2$ electrode set-up can with advantage be left out, as the scratches from the grinding of the point of the combination platinum electrode provides for sufficient electrolytic contact to the sensitive part of this electrode.

To place a sensitive electrode as the bottom in the measuring chamber provides further possibilities for simultaneous measurement by more electrodes in the same measuring chamber, in that the lid mentioned in the set-ups above can, without much difficulty, be replaced by another electrode—or by a tube connected to such an electrode. Finally, a tube can be mounted in the lid, so that the measurement conditions in the liquid sample can be maintained or varied as need be, by blowing a gas mixture into the measuring chamber.

Such combined measuring systems are of particular interest in biological and biochemical measurements, as for instance measurements in blood. Here it is usually necessary to know and to simultaneously measure two of the essential variable parameters to determine the full status. In the determination of the full acid-base status, pH and $Pco_2$ are essential; in pulmonary or respiratory diagnoses $Pco_2$ and $Po_2$ are required; whereas in the determination of oxygen status pH and $Po_2$ may be required as measured factors to be used in known formulae or relationships in the disclosure of the full status.

Electrodes which are placed as a substitute for the lid or cover in the measuring chamber and for permitting simultaneously measuring of two factors, i.e., pH, $Pco_2$, or $Po_2$, can be of the usual or conventional design with only the added requirement that their design preserves the requirement for a measuring chamber of as small a volume as possible.

FIGURES 6 to 9 illustrate examples of such systems employing two electrodes, wherein one electrode essentially forms the bottom of the measuring chamber.

Figure 6:
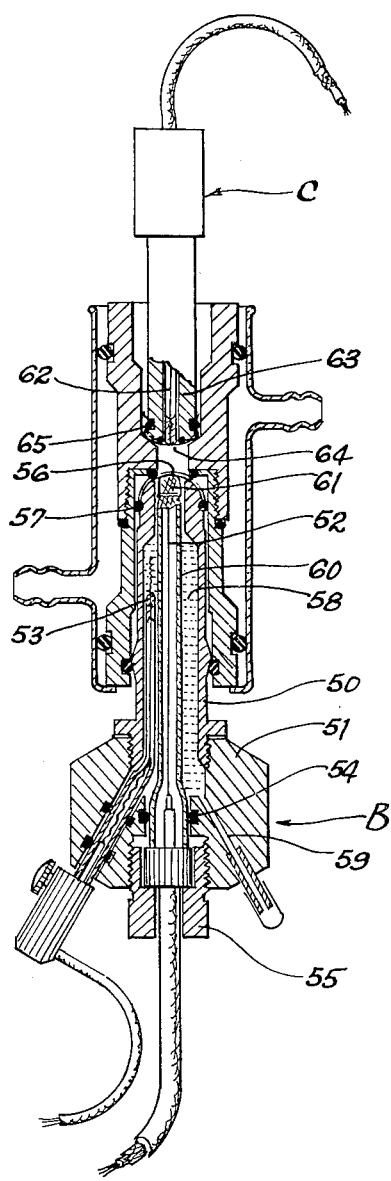

FIGURE 6 shows a set-up for simultaneous measurement of $Po_2$ and $Pco_2$ based on the $Po_2$ electrode set-up previously described in FIGURE 5. The $Pco_2$ electrode here is shown in a position where it constitutes the bottom of the chamber, A, which otherwise is designed completely as shown in FIGURE 5. The glass electrode 60 of the $Pco_2$ electrode is provided with an additional porous membrane 61 to maintain an electrolyte layer around the tip of the glass electrode, otherwise part B from FIGURE 5 is also unchanged. Part C is a $Po_2$ electrode of conventional shape for example, as in U.S. Patent No. 2,913,386, consisting of a platinum cathode 62 and an annular silver anode 63, which is covered by a plastic membrane 64, which is maintained by an O-ring 65.

FIGURES 7 and 8 show two designs for a set-up which provides for simultaneous measurement of pH and $Pco_2$ in one chamber, in which the $Pco_2$ electrode constitutes the bottom in the chamber. The measuring chamber and the $Pco_2$ electrode are constructed according to the previous description in FIGURE 3 with an arrangement for measurement of pH being added. This arrangement can in a very simple form be a combined glass calomel electrode of the form of a rod as shown in FIGURE 7. The pH electrode 70 has a liquid junction 71 to the calomel halfcell 72 placed close to the tip of the electrode where the interior halfcell 73 is terminated by a pH sensitive glass membrane 74.

In FIGURE 8, the $Pco_2$ electrode, and measuring chamber, as well as independent pH electrodes, are completely thermostatted. There is provided a piston 80 containing a channel which by means of a tube or a flexible piece of tubing 81 is connected to a capillary electrode for pH measurement of common commercial design. The main elements of the electrode are a capillary tube of pH sensitive glass 82 placed in the indicator halfcell 83. The extension of the capillary tube is connected to the calomel reference halfcell 84, and both halfcells are surrounded by a jacket 85, through which water can be circulated for thermostatting. In this design, the measuring chamber is still filled from the top, and then by depressing the piston into the chamber, the sample is forced into the pH sensitive capillary electrode.

Even if the combinations $Pco_2$-pH and $Pco_2$-$Po_2$ are today the preferred sets of parameters, a simultaneous measurement of pH and $Po_2$ can be of interest under certain conditions. This applies for example to the determination of the oxygen concentration in blood, where a spectrophotometric measurement often is compared with measurement of the two parameters mentioned. FIGURE 9 shows a system where the pH set-up from FIGURE 1 has been extended with a $Po_2$ electrode of the kind previously described in FIGURE 6. In FIGURE 10, there is shown a $Po_2$ electrode 90 which uses the reference cell 9 (FIGURE 1) of the pH electrode as anode. The membrane 16, which surrounds the tip of the $Po_2$ electrode, consists of a material which permits electrolytic contact with the liquid sample in addition to diffusion of oxygen. Membranes of a plastic material which are produced by evaporation of a solvent from a drop of a solution of plastic material placed on the tip of the electrode has proved to be the most suitable. By this type of $Po_2$ electrode, the current through the reference electrode 9, and $Po_2$ electrode 90 which is a plastic-coated metal electrode, is a measure of the partial pressure of oxygen in the liquid sample.

One example of an electrode set-up based on the present invention, but for the simultaneous measurement of $Po_2$, $Pco_2$, and pH, is shown in FIGURE 11. A $Pco_2$ electrode 101 and a $Po_2$ electrode 102 of known construction, have been placed at the top and in the walls of the measuring chamber 114, respectively. The glass electrode 103 of the pH measuring system of the design described in FIGURE 1 is placed as the bottom in the measuring chamber, whereas the reference electrode 105 through the salt bridge 104 is connected to the measuring chamber 114 through the walls of the chamber. To maintain the glass and reference electrodes in the desired positions in the electrode holder 107, they have been provided with a cap screw 108 and a cap nut 106, respectively, as mentioned previously in connection with FIGURE 1. The $Po_2$ electrode 102 is placed in a special tubular body 110, which has been screwed into the electrode holder 107, and the electrode itself is kept in place by a cap screw 109. The wall of the measuring chamber is made from a soft gasket 113 of a gas-tight material, e.g. butyl rubber. This gasket is provided with a feed-through liquid junction 115 for the salt bridge of the calomel electrode 104 and a feed-through for the tip of the $Po_2$ electrode 102. The gasket also serves as a seat for the glass electrode 103 and the $Pco_2$ electrode 101.

In the detail drawing (FIGURE 12), indication has also been made of the membrane of the $Po_2$ electrode 116 and the cathode 117, which in this case protrudes slightly more than normal for this type of electrode. The two membranes of the $Pco_2$ electrode 118 and 119, which have been described previously (FIGURE 3) are also illustrated. To assure temperature stability during the measurements, the complete electrode holder 107 is enclosed in a jacket 112, through which thermostatted water can be circulated, as O-rings 111 provide tight seals at the ends of the electrode holder.

Finally, FIGURE 13 shows how the lid 49' in an electrode set-up, corresponding to the one shown in FIGURE 5, can be used to place the liquid sample in contact with a gas of controlled composition, which is conducted through the tube 49" placed in the lid. In the present case, this can be used for calibration of the $Po_2$ electrode, as the liquid sample in the measuring chamber will adopt the same $Po_2$ as the gas over the liquid after some time, by which one point on the calibration curve of the electrode is obtained.

A corresponding method could by use of a pH measuring cell be used for measurement of an additional parameter in addition to pH with only one electrode chain, in that a pH measurement carried out after a gas with known composition, in particular with regard to the carbon dioxide contents, has bubbled through the sample, permits the calculation of the bicarbonate concentration in the liquid sample. This kind of measurement is well known from blood examinations, where standard bicarbonate value is obtained from a pH measurement on blood, which is in equilibrium with a carbon dioxide oxygen mixture with a $P_{CO_2}$ of 40 mm. Hg at 38° C.

Finally, examples of other types of electrodes placed in a measuring chamber, where at least one of the basic types mentioned above constitutes the bottom or parts thereof could be mentioned. Such electrodes could be redox electrodes or conductivity electrodes, which in certain cases also could provide valuable information about the chemical conditions in liquid samples. Further, the examples mentioned above do not limit the application of the invention to measuring cells, in which only one electrode has been placed in the bottom of the measuring chamber. More than one electrode could easily be placed side by side; or measuring chambers, each one with an electrode in the bottom, could be interconnected.

It will be understood that other changes and combinations may be made in the systems described which provide the characteristics of this invention without departing from the spirit thereof particularly as defined in the following claims.

That which is claimed is:

1. In an electrode system for electro-chemical measurements in single liquid samples wherein the system comprises at least one electrode chain consisting of an indicator electrode and a reference electrode, and a meter device connected to said electrodes for measuring values of said samples, the improvement comprising a sample chamber freely accessible from above defined by bottom and side walls, at least the indicator electrode included in the system constituting the bottom wall of the sample chamber, and tubular means positioned internally of said indicator electrode for trapping air bubbles, at least a portion of said tubular means being spaced from the interior walls of the indicator electrode.

2. An electrode system according to claim 1 wherein at least one of the electrodes in an electrode chain of the system and the measuring chamber are thermostatted.

3. An electrode system according to claim 1 wherein said sample chamber is adapted to hold between 10–500 µl. of a sample.

4. An electrode system according to claim 1 wherein the indicator electrode is structurally combined with a reference electrode to provide an intergrated electrode unit.

5. An electrode system according to claim 4 wherein the reference electrode comprises an annular piece of metal located around the indicator electrode.

6. An electrode system according to claim 1 wherein a membrane of an electrically insulating material is placed between the indicator electrode and the liquid sample, said membrane having a maximum thickness of 100 microns.

7. An electrode system according to claim 1 including at least one additional electrode associated with the walls of the measuring chamber for contact with the sample.

8. An electrode system according to claim 1 wherein said indicator electrode and said reference electrode are electrically connected by means of a liquid-junction through an opening defined in the wall of said measuring chamber.

9. An electrode system according to claim 8 including means for sucking part of the sample into said liquid-junction for establishing electrical contact between said indicator electrode and said reference electrode.

10. An electrode system according to claim 8 including a porous element in said liquid-junction.

11. An electrode system according to claim 1 including means for conducting a stream of gases into said measuring chamber for contact with the liquid sample enclosed in the measuring chamber.

12. An electrode system according to claim 11 wherein said means for conducting gases are provided in the wall of said measuring chamber.

13. An electrode system according to claim 11 including a lid for covering the top of said sample chamber, and wherein said means for conducting said gases are carried by said lid.

14. In an electrode system for electrochemical measurements of single liquid samples wherein the system comprises at least one electrode chain consisting of an indicator electrode and a reference electrode, and a meter device connected to said electrodes for measuring values of said sample, the improvement comprising a measuring chamber for holding a single sample, at least one indicator electrode included in the system, said indicator electrode being vertically disposed with the upper end of the electrode forming the bottom wall of said chamber and with said sample being accessible from above, said upper end of the electrode comprising a membrane separating the sample and the electrolyte which is contained in the indicator electrode, the electrolyte being located immediately adjacent the inner surface of said membrane, and including tubular means located internally of said indicator electrode for preventing formation of an air bubble between said inner surface and said electrolyte, at least a portion of said tubular means being spaced from the interior walls of the indicator electrode.

15. In an electrode system for electro-chemical measurements in liquid samples wherein the system comprises at least one electrode chain consisting of an indicator electrode and a reference electrode, and a meter device connected to said electrodes for measuring values of said samples, the improvement wherein a sample chamber is provided for said samples and wherein at least one indicator electrode included in the system constitutes the bottom of the sample chamber, said indicator electrode comprising a rotationally symmetrical glass electrode characterized by an internal air trap consisting of a tube, said tube having an annular, tight connection to the interior surface defined by the glass wall of the electrode, and said tube defining an open end in the direction of the socket of the indicator electrode.

16. An electrode system according to claim 15 wherein said air trap comprises a glass tube fused to the interior glass wall of the electrode.

References Cited

UNITED STATES PATENTS

| | | | |
|---|---|---|---|
| 2,387,727 | 10/1945 | Godshalk | 204—195.1 |
| 2,886,771 | 5/1959 | Vincent | 204—195 |
| 3,088,905 | 5/1963 | Glover | 204—195 |
| 3,098,813 | 7/1963 | Beebe et al. | 204—195 |
| 3,103,480 | 9/1963 | Watanabe et al. | 204—195.1 |
| 3,151,052 | 9/1964 | Arthur et al. | 204—195 |
| 3,188,285 | 6/1965 | Watanabe et al. | 204—195 |
| 3,196,100 | 7/1965 | Digby | 204—195 |
| 3,281,348 | 10/1966 | Schumacher et al. | 204—195 |
| 3,334,623 | 8/1967 | Hillier et al. | 204—195 |
| 3,380,905 | 4/1968 | Clark | 204—195 |
| 3,410,778 | 11/1968 | Krasberg | 204—195 |

OTHER REFERENCES

Dole: "Glass Electrode," 1941, pp. 29 and 92.
Laughlin et al.: "Jour. of Lab. a. Clin. Med.," August 1964, pp. 330–332.

T. TUNG, Primary Examiner